US011862419B2

(12) United States Patent
Balasubramanian et al.

(10) Patent No.: US 11,862,419 B2
(45) Date of Patent: Jan. 2, 2024

(54) TOROIDAL ENCAPSULATION FOR HIGH VOLTAGE VACUUM INTERRUPTERS

(71) Applicant: EATON INTELLIGENT POWER LIMITED, Dublin (IE)

(72) Inventors: Ganesh Kumar Balasubramanian, Horseheads, NY (US); Eric Dennis Smith, Painted Post, NY (US); Louis G. Campbell, Elmira, NY (US); Wangpei Li, Horseheads, NY (US); Xin Zhou, Franklin Park, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/526,550

(22) Filed: Nov. 15, 2021

(65) Prior Publication Data

US 2023/0154706 A1 May 18, 2023

(51) Int. Cl.
*H01H 33/42* (2006.01)
*H01H 33/662* (2006.01)
*H01H 33/664* (2006.01)
*H01H 33/666* (2006.01)

(52) U.S. Cl.
CPC .......... *H01H 33/666* (2013.01); *H01H 33/42* (2013.01); *H01H 33/664* (2013.01); *H01H 33/66207* (2013.01); *H01H 2033/6623* (2013.01)

(58) Field of Classification Search
CPC ................. H01H 33/666; H01H 33/42; H01H 33/66207; H01H 33/664; H01H 2033/6623; H01H 33/66261; H01H 33/66
USPC ................ 218/140, 118, 134, 135, 137–139, 218/154–155; 200/302.1; 335/201
See application file for complete search history.

(56) References Cited

U.S. PATENT DOCUMENTS

| | | | | |
|---|---|---|---|---|
| 6,130,394 | A * | 10/2000 | Hogl ................ | H01H 33/66207 218/138 |
| 7,852,180 | B2 * | 12/2010 | Gentsch ........... | H01H 33/66207 335/201 |
| 8,785,802 | B2 * | 7/2014 | Shang .............. | H01H 33/66207 218/120 |
| 9,214,292 | B2 * | 12/2015 | Bramhapurikar ............................ | H01H 33/66207 |
| 10,102,989 | B2 * | 10/2018 | Hartmann ........ | H01H 33/66207 |
| 2006/0096856 | A1 * | 5/2006 | Martin ................ | H01H 33/027 204/298.21 |
| 2010/0314357 | A1 * | 12/2010 | Kobayashi ....... | H01H 33/66207 218/140 |

(Continued)

FOREIGN PATENT DOCUMENTS

| | | | |
|---|---|---|---|
| EP | 2 141 720 | A1 | 1/2010 |
| JP | 2004 335386 | A | 11/2004 |

(Continued)

OTHER PUBLICATIONS

Translation of JP2014182876 (Original document published Sep. 29, 2014) (Year: 2014).*

(Continued)

*Primary Examiner* — William A Bolton
(74) *Attorney, Agent, or Firm* — Eckert Seamans Cherin & Mellott, LLC

(57) ABSTRACT

A vacuum interrupter has a toroidal portion at one or both ends that achieves higher dielectric levels and hence higher interruption levels.

17 Claims, 5 Drawing Sheets

(56) References Cited

U.S. PATENT DOCUMENTS

| | | | | |
|---|---|---|---|---|
| 2015/0041437 A1* | 2/2015 | Chapelle | H01H 9/346 | 218/139 |
| 2015/0357136 A1* | 12/2015 | Chen | H01H 33/664 | 218/123 |
| 2016/0181027 A1* | 6/2016 | Cao | H01H 33/66207 | 218/139 |

FOREIGN PATENT DOCUMENTS

| | | | |
|---|---|---|---|
| JP | 2014 182876 | A | 9/2014 |
| WO | 00/41199 | A1 | 7/2000 |

OTHER PUBLICATIONS

European Patent Office, "International Search Report and Written Opinion" for corresponding International (PCT) Patent Application No. PCT/EP2022/025506, dated Feb. 15, 2023, 19 pp.

* cited by examiner

TOROIDAL ENCAPSULATION FOR HIGH VOLTAGE VACUUM INTERRUPTERS

BACKGROUND

Field

The disclosed concept relates generally to a vacuum interrupter and, more particularly, to a vacuum interrupter having a toroidal portion at one or both ends that achieves higher dielectric levels and hence higher interruption levels.

Related Art

Vacuum interrupters include separable main contacts located within an insulated and hermetically sealed envelope that may be referred to as a vacuum chamber. The vacuum chamber typically includes, for example and without limitation, a number of cylinder-shaped sections of ceramics (e.g., without limitation, a number of tubular ceramic portions that are of a roughly cylindrical shape) for electrical insulation that are capped by a number of end members (e.g., without limitation, metal components, such as metal end plates; end caps; seal cups) to form an envelope in which a vacuum or a reduced pressure is drawn. The example ceramic section is typically cylindrical; however, other suitable cross-sectional shapes may be used. Two end members are typically employed. Where there are multiple ceramic sections, an internal center shield is disposed between the example ceramic sections. Some known vacuum interrupters also include encapsulation that is applied over an exterior surface thereof and that may be formed of a silicone material or other appropriate insulating materials.

Vacuum interrupters suffer from a number of shortcomings. For example, on vacuum interrupters used in typical high voltage applications, such as applications where line-to-line voltage ratings of 72 kV exist, the vacuum interrupter must be able to achieve a 350 kV Lightning Impulse Withstand Voltage (LIWV) rating, which has been achievable. However, on vacuum interrupters used in even higher voltage applications, such as in application where line-to-line voltage ratings of 84 kV exist, the vacuum interrupter must be able to achieve a 400 kV LIWV rating, which can be difficult to achieve. There is thus room for improvements in vacuum switching apparatus.

SUMMARY

These needs and others are met by embodiments of the invention, which are directed to an improved vacuum interrupter.

As one aspect of the disclosed and claimed concept, an improved vacuum interrupter is structured to interrupt electrical current to a protected portion of a circuit, the general nature of which can be stated as including an envelope that can be stated as including a cylinder that is insulative and a pair of end caps situated at opposite ends of the cylinder, the envelope having an interior region and having a reduced pressure within the interior region, a movable contact movably situated on the envelope and situated adjacent an end cap of the pair of end caps, a stationary contact situated on the envelope and situated adjacent another end cap of the pair of end caps, and a coating that is formed at least in part of an insulative material and that is situated on an exterior of the envelope, the coating can be stated as including a first portion situated on the cylinder and having a first thickness in a radial direction with respect to the cylinder, the coating further can be stated as including a second portion situated adjacent the end cap and having a second thickness greater than the first thickness in the radial direction. As employed herein, the expression "a number of" shall refer broadly to any non-zero quantity, including a quantity of one.

A toroidal-shaped encapsulation, such as may be made from silicone or other appropriate material, on the end sections of a vacuum interrupter (VI) that is used in a typically high voltage application, for example in an application involving line-to-line voltage ratings of 72 kV and above, effectively helps with achieving higher ratings of AC withstand voltage and passing high lightning impulse withstand voltage levels of 400 KV successfully. While silicone encapsulation on the VI is typically applied after all conditioning processes are complete, it can also be applied before conditioning to provide some processing benefits. The addition of a toroidal-shaped silicone encapsulation provides a number of enhancements on the VI:

- very good protection of triple point junctions;
- very good electric-field distribution to help mitigate surface flashovers wherein equipotential voltage lines spread out protecting the triple point junctions;
- increased dielectric strength;
- increased electrical permittivity;
- added creepage length;
- more margin on 400 kV LIWV ratings;
- ability to pass high voltage levels no matter how the VI is installed in the mechanism, such as in GIS or compressed air etc.;
- employment in designs involving pole-to-pole layout with safe insulating distances between VIs and the enclosure in 3-phase mechanism configurations;
- the insulating medium is dry air, and the toroidal profile of silicone encapsulation will help space the distance for achieving 160 kV high potential and 400 kV LIWV; and
- when applied before conditioning, protects the VI from through-ceramic dielectric breakdowns (punctures) during the conditioning process that cause leaks and scrap product during manufacturing.

The shape of the toroidal profiles of the insulation member, made of silicone in the depicted exemplary embodiment, that are situated at both ends of the envelope of the vacuum interrupter and that are integrated with the silicone coating that overlies the envelope of the VI helps achieving higher dielectric levels. The toroidal shape is created in a way to encompass and protect the triple point junctions which are formed of the conductor, ceramic, and the silicone insulator. The radii of the hemispheres peak or have an apex along the junction planes to enable the high field gradients, as depicted by equipotential lines, to move away from the triple junctions. Electric field gradients, as depicted by equipotential lines, are advantageously pushed generally in a radial direction from the standpoint of the cylinder of the VI envelope to advantageously drive corona, discharge, and external flashovers during very high voltage dielectric tests. Such electric fields in the vicinity of the triple junctions are mitigated very well and this helps with preventing destructive dielectric breakdown through ceramic, and avoids the causing of any leaks, which advantageously improve the overall high voltage performance of the VI. The advantageous deflection by the toroidal silicone profiles of the disclosed and claimed concept of the equipotential lines takes place at these critical triple junctions, and the toroidal shape profile plays an advantageous role in enhancing the VI performance.

The silicone material itself from which the toroidal profiles are formed is formulated to be of a high relative permittivity. It is noted that the relative permittivity, or dielectric constant, of a material is its (absolute) permittivity expressed as a ratio relative to the permittivity of a vacuum. In the depicted exemplary embodiment, the insulative silicone material from which the coating over the VI, and including the toroidal profiles at the ends, has a relative permittivity that is in a range of about 2.7 to 5 and, more particularly, may have a relative permittivity that is about 3.5. Molding a metallic film or sheath that is embedded into the toroidal profiles further helps to mitigate the high field gradients at the triple junctions. Coating in outer surface of the toroidal profiles with a metallic covering in the form of a coating or layer around the toroidal profiles also contributes to mitigate the high field gradients at the triple junctions.

BRIEF DESCRIPTION OF THE DRAWINGS

A full understanding of the disclosed concept can be gained from the following Description when read in conjunction with the accompanying drawings in which.

Similar numerals refer to similar parts throughout the Specification.

DESCRIPTION

Figure 1:
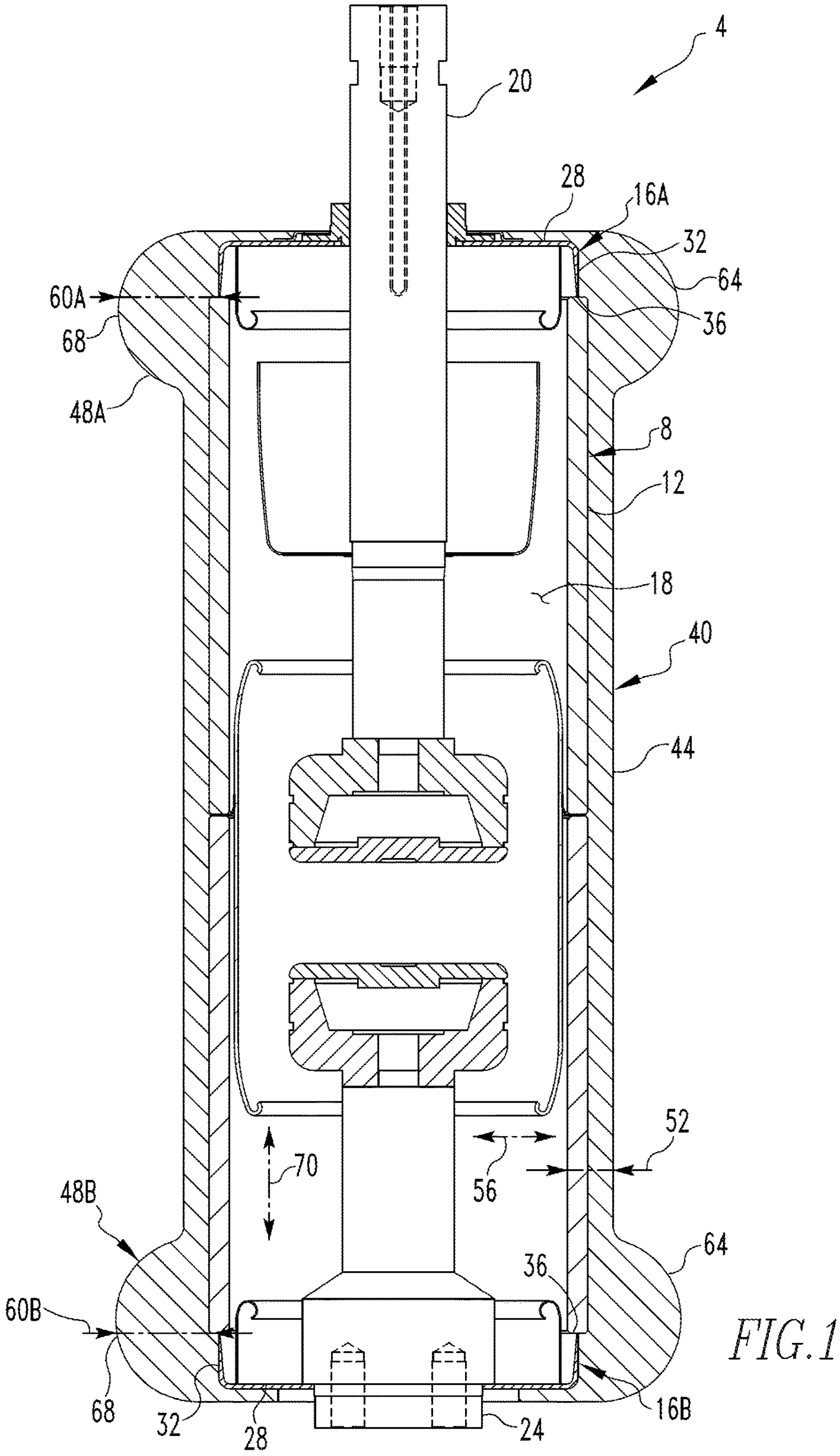
FIG. 1 is a sectional view of an improved vacuum interrupter in accordance with a first embodiment of the disclosed and claimed concept in an OPEN state.
Figure 2:
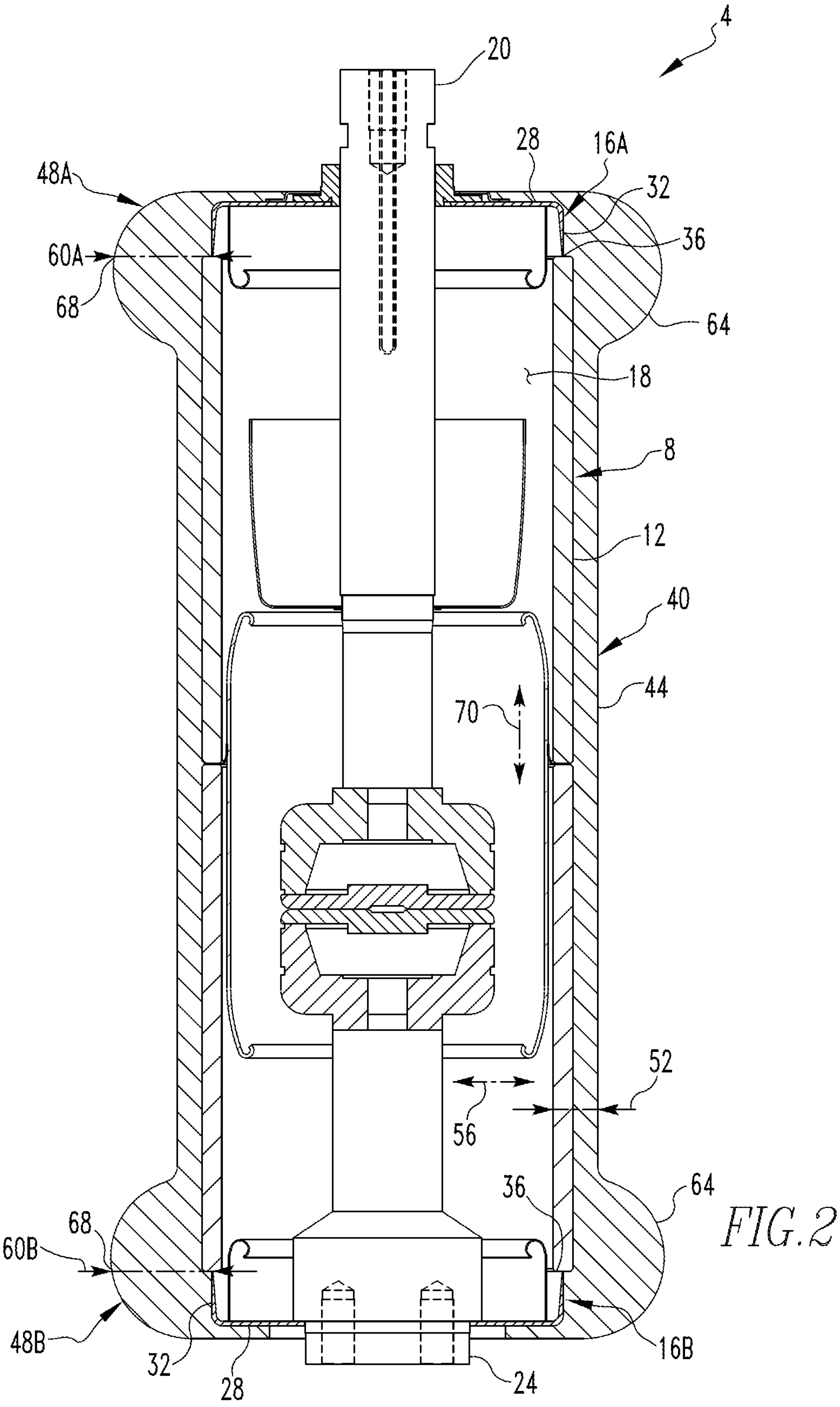
FIG. 2 is view similar to FIG. 1, except depicting the vacuum interrupter in a CLOSED state.

An improved vacuum interrupter (VI) 4 in accordance with a first embodiment of the disclosed and claimed concept is depicted generally in FIGS. 1 and 2. The exemplary vacuum interrupter 4 includes an envelope 8 that can be said to include a cylinder 12 and to further include a pair of end caps that are indicated at the numerals 16A and 16B. The envelope 8 has an interior region 18 having a reduced pressure or a vacuum formed therein.

The cylinder 12 is formed of an insulative material, such as a ceramic or other appropriate material, and thus is itself insulative. While the cylinder 12 is depicted herein as being of a hollow cylindrical shape and as having both a radial direction and a longitudinal direction with respect thereto, it is understood that in other embodiments the cylinder 12 can be of a rectangular or other cross-sectional shape and as still having a radial direction and a longitudinal direction without departing from the spirit of the disclosed concept.

The vacuum interrupter 4 further includes a movable contact 20 and a stationary contact 24. The movable contact 20 is movably situated on the envelope 8 and extends outwardly through an opening formed in the end cap 16A while retaining the reduced pressure within the interior region 18. The stationary contact 24 is stationary with respect to the envelope 8 and extends outwardly through an opening formed in the end cap 16B. The movable contact 20 is movable with respect to the envelope 8 to cause the vacuum interrupter 4 to be movable between an OPEN state, such as is depicted generally in FIG. 1, wherein the movable and stationary contacts 20 and 24 are electrically disconnected from one another, and a CLOSED state, such as depicted generally in FIG. 2, wherein the movable and stationary contacts 20 and 24 are electrically connected with one another. In an understood fashion, the movable and stationary contacts 20 and 24 are electrically connectable with a protected portion of a circuit.

The end caps 16A and 16B can each be generally characterized as including a planar portion 28 and a cylindrical portion 32, wherein the cylindrical portion 32 protrudes from a perimeter of the planar portion 28. The cylindrical portion 32 abuts an end of the cylinder 12 at a junction 36. The cylindrical portions 32 of the end caps 16A and 16B each form one of the junctions 36, which are disposed at opposite ends of the cylinder 12.

The vacuum interrupter 4 further includes a coating 40 that is formed of an insulative material and that is formed on an exterior of the envelope 8. The coating 40 can be said to include a first portion 44 that is formed generally on an exterior surface of the cylinder 12 and a pair of second portions that are indicated at the numerals 48A and 48B that are formed generally on the end caps 16A and 16B and on the end regions of the cylinder 12 where the junctions 36 are situated.

As can be understood from FIG. 1, for example, the first portion 44 is of a first thickness 52 as measured in a radial direction 56 with respect to the cylinder 12. The first thickness 52 is of a substantially unvarying dimension in a region of the coating 40 that extends generally between the second portions 48A and 48B. In other embodiments, the first portion 44 or the second portions 48A and 48B may have an encapsulated shape that additionally includes ribs or watersheds along this length. The benefits of toroidal encapsulation can also be applied here, as long as the substantially largest diameter of the insulation is applied at the triple junctions at both ends as described herein.

In contrast to the first portion 44, the second portions 48A and 48B are each of a toroidal profile, meaning that they each have an arcuate outer surface 64 and a second thickness 60A and 60B as measured in the radial direction 56 that varies along a longitudinal direction 70 with respect to the cylinder 12. The aforementioned ribs or watersheds that may exist along the first portion 44 would be smaller than the toroidal shapes at the second ends 48A and 48B.

Moreover, it can be seen from FIGS. 1 and 2 that the second portions 48A and 48B each have an apex 68, which can be referred to as a region of relatively greatest thickness, at a location along the longitudinal direction 70 that is adjacent in the radial direction 56 the corresponding junction 36. In the depicted exemplary embodiment, each apex 68 is situated at a location along the longitudinal direction 70 to be substantially aligned in the radial direction 56 with the junction 36 of the corresponding end of the envelope 8. The longitudinal direction can also be seen as being parallel and/or coaxial with an axis that includes the axially-aligned movable and stationary contacts 20 and 24.

Figure 3:
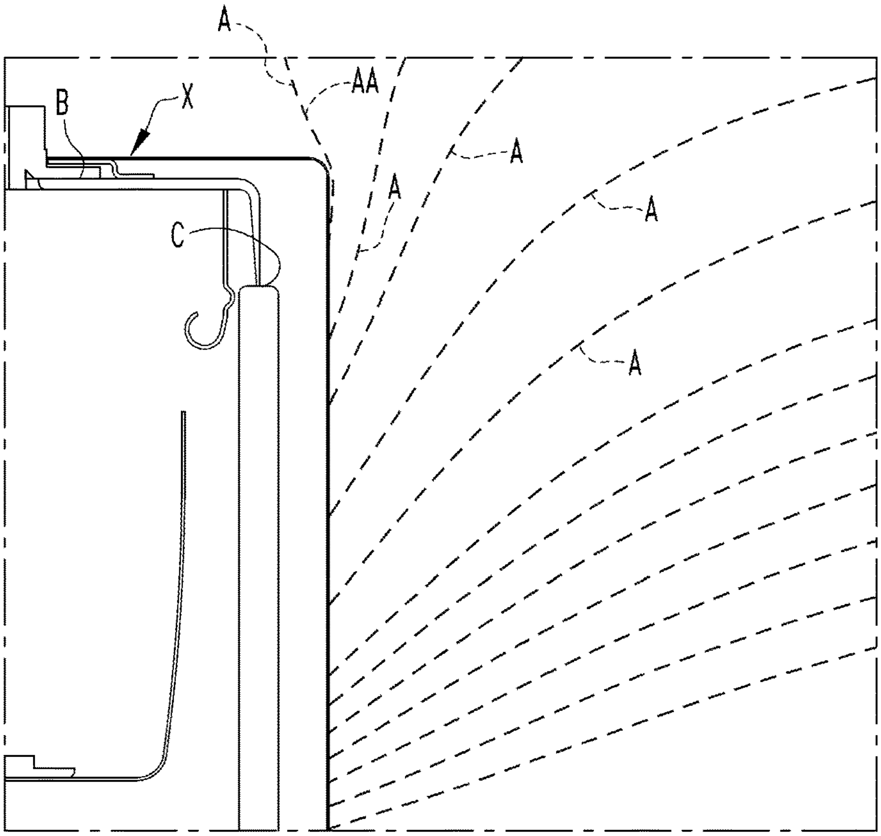
FIG. 3 (PRIOR ART)
FIG. 3 is a depiction of equipotential electric field lines in a prior art vacuum interrupter showing equipotential electric field lines wrapping around the triple junctions and increasing the stresses at these locations.

In the depicted exemplary embodiment, the coating 40 is formed of a single molding of a silicone insulation material having a high relative permittivity that is in a range of about 2.7 to 5 and, more particularly, may have a relative permittivity that is about 3.5. Such high relative permittivity advantageously deflects electric fields away from the junctions 36, which are the triple junctions of the vacuum interrupter 4. For instance, FIG. 3 depicts at the letter X a previous vacuum interrupter that is formed without the first and second portions 48A and 48B and that includes an end cap B having a triple junction C. FIG. 3 also depicts a set of equipotential field lines at the numeral A, with one of the equipotential field lines A also being designated with AA that can be seen in FIG. 3 to be extending at least partially across the end cap B in a direction generally toward where the stationary contact would be. This is undesirable and is alleviated by the disclosed and claimed concept.

Figure 4:
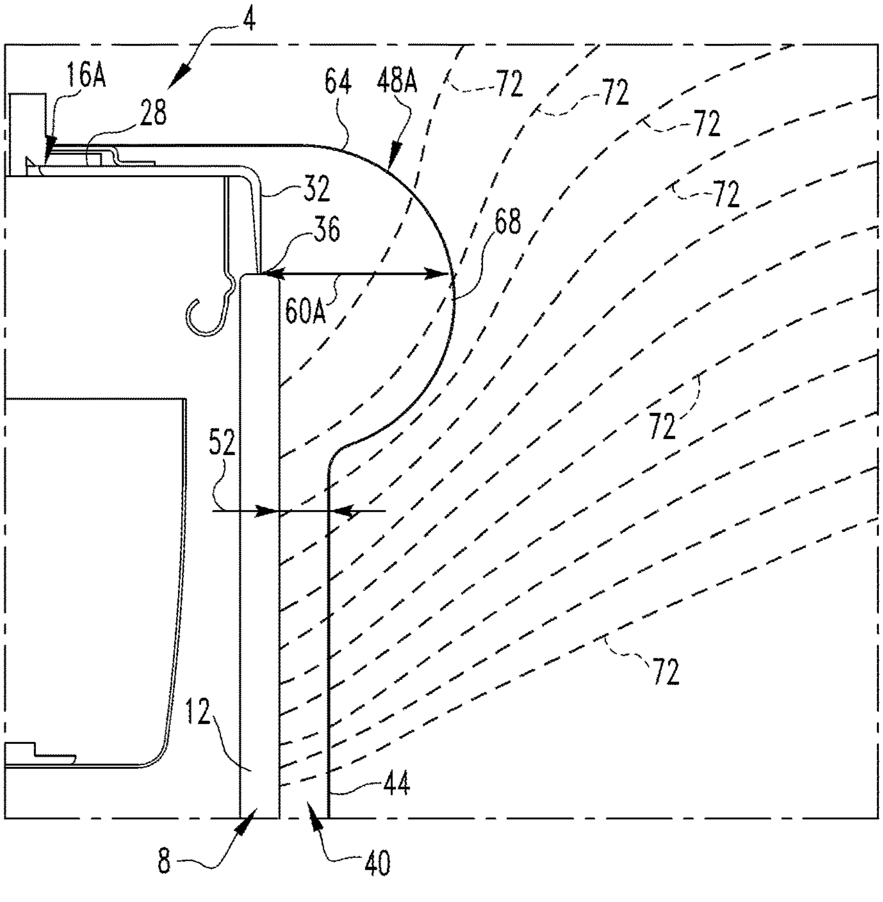
FIG. 4 is a view depicting equipotential electric field lines of the improved vacuum interrupter of FIG. 1 showing the equipotential electric field lines deflecting away at the triple junctions to help resolve the high field gradients.

More specifically, FIG. 4 depicts at the numeral 72 a set of equipotential field lines extending from a portion of the vacuum interrupter 4. As can be seen in FIG. 4, the first portion 48A advantageously deflects the electric fields, as represented by the equipotential field lines 72, so that they do not flash over the end cap 16A and thus advantageously resist damage to the triple junction that can be said to exist at the junction 36. The same advantages are provided by the second portion 48B and with respect to the end cap 16B. This advantageously enables the vacuum interrupter 4 to be used in relatively higher voltage applications than the vacuum interrupter X of FIG. 3.

Figure 5:
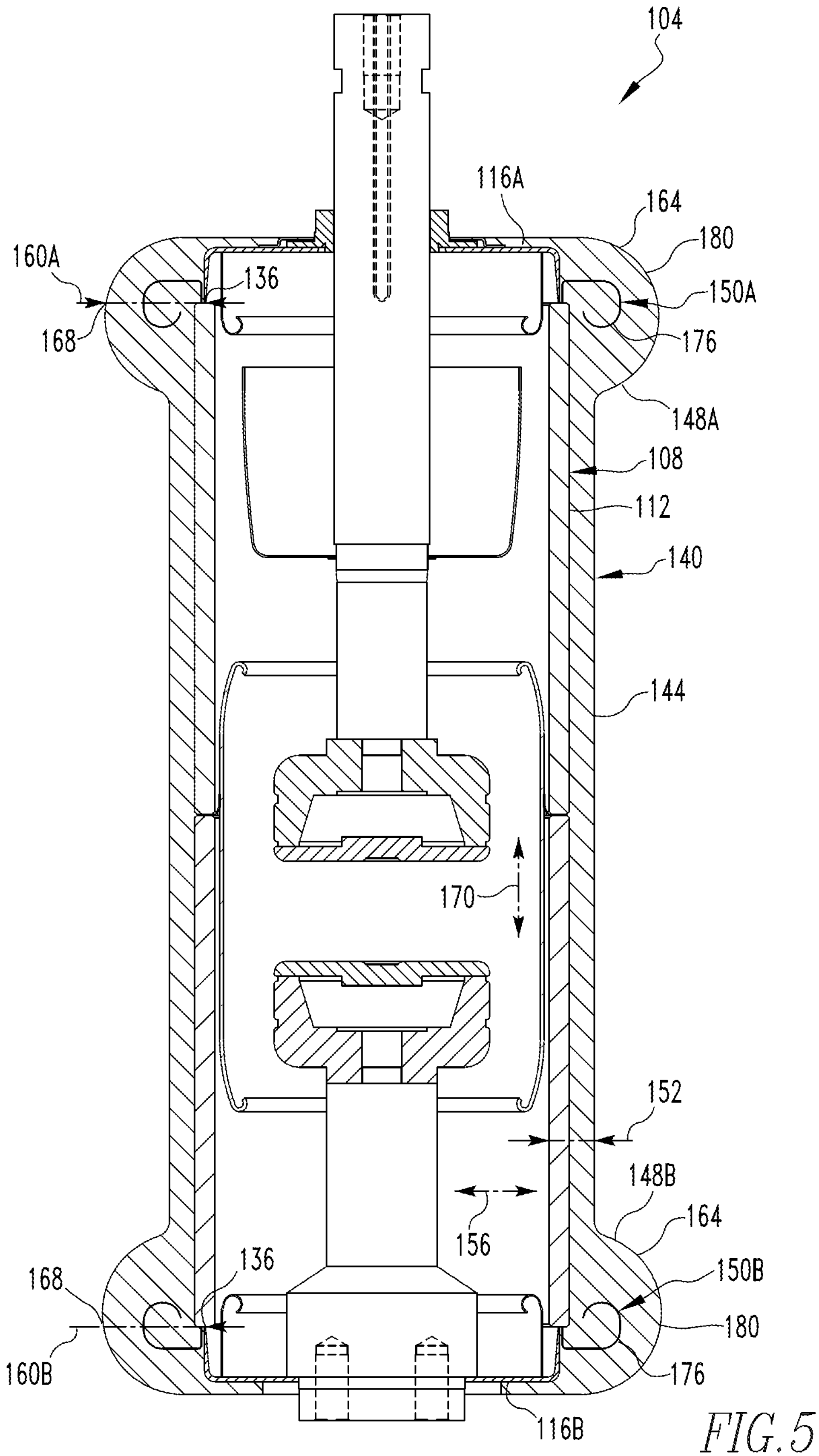
FIG. 5 is a sectional view of an improved vacuum interrupter in accordance with a second embodiment of the disclosed and claimed concept in an OPEN state.

An improved vacuum interrupter 104 in accordance with a second embodiment of the disclosed and claimed concept is depicted generally in in FIG. 5. The vacuum interrupter 104 is similar to the vacuum interrupter 4 in that the vacuum interrupter 104 includes an envelope 108 having an insulative cylinder 112 and a pair of end caps 116A and 116B that meet the cylinder 112 at a pair of junctions 136, and having a reduced pressure therein. The envelope 108 likewise includes a coating 140 having a first portion 144 and a pair of second portions 148A and 148B that are likewise of a toroidal shape. However, the second portions 148A and 148B each additionally have a metallic component indicated at the numerals 150A and 150B in addition to the silicone insulative material that forms the second portions 148A and 148B.

As with the coating 40 of the vacuum interrupter 4, the first portion 144 is of a first thickness 152 in a radial direction 156 with respect to the cylinder 112 that is of a substantially unvarying dimension between the first and second portions 148A and 148B. As noted elsewhere herein, however, the first portion 144 again can include ribs or watersheds along this length that are smaller than the end toroids. The second portions 148A and 148B each have a second thickness 168 and 160B, respectively, as measured in the radial direction 156 that varies along a longitudinal direction 170 with respect to the cylinder 112. As before, the first and second portions 148A and 148B are each situated along the longitudinal direction 170 to each have an apex 168 that is adjacent in the radial direction 156 the corresponding junction 136 and which, in the depicted exemplary embodiment, is substantially aligned with the junction 136 in the radial direction 156. The second portions 148A and 148B each have an outer surface 164 that is of an arcuate shape and which, in the depicted exemplary embodiment, is of a toroidal profile.

Figure 6:
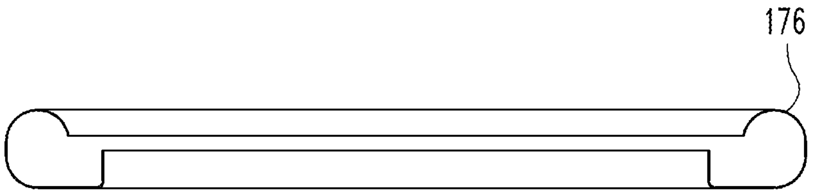
FIG. 6 is a sectional view of a metallic components of the second embodiment depicted as being sectioned along a different section than that depicted in FIG. 5.

The metallic components 150A and 150B of the exemplary vacuum interrupter 104 each include a metallic body 176 that is depicted in FIGS. 5 and 6 and that is embedded in the silicone material of each of the second portions 148A and 148B. Each metallic body 176 is generally ring-shaped and extends about the cylindrical portion of each end cap 116A and 116B, and at least a portion of the metallic body 176 is disposed generally between the junction 136 and the apex 168 of the corresponding second portion 148A and 148B. In the depicted exemplary embodiment, the metallic components 150A and 150B each further include a metallic covering 180 that is in the form of a metallic coating that is situated on the outer surface 164 of the silicone material of each of the second portions 148A and 148B. It is understood that in other embodiments the metallic components 150A and 150B might include either the metallic body 176 or the metallic covering 180, or both, without departing from the spirit of the instant disclosure.

The metallic body 176 and the metallic covering 180 each advantageously assist in further dispersing the electric fields away from the end caps 116A and 116B and away from the junctions 136, which further assists in protecting the vacuum interrupter 104 from flashover and from a breakdown of the vacuum interrupter 104. This is advantageous because it enables the vacuum interrupter 104 to be used in various high-voltage applications without a risk of breakdown. It is further advantageous, but not required, that the metallic covering be nonmagnetic to prevent eddy current heating during conduction through the VI in its closed state. Other benefits will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A vacuum interrupter structured to interrupt electrical current to a protected portion of a circuit, comprising:

an envelope comprising a cylinder that is insulative and a pair of end caps situated at opposite ends of the cylinder, the envelope having an interior region and having a reduced pressure within the interior region;

a movable contact movably situated on the envelope and situated adjacent an end cap of the pair of end caps;

a stationary contact situated on the envelope and situated adjacent another end cap of the pair of end caps; and a coating that is formed at least in part of an insulative material and that is situated on an exterior of the envelope, the coating comprising a first portion situated on the cylinder and having a first thickness in a radial direction with respect to the cylinder, the coating further comprising a second portion situated adjacent the end cap and having a second thickness greater than the first thickness in the radial direction, the second portion being solid in the radial direction;

wherein the second portion has an outer surface having an arcuate profile along a longitudinal direction with respect to the cylinder, and wherein the arcuate profile is substantially circular.

2. The vacuum interrupter of claim 1 wherein the arcuate profile is a toroidal profile.

3. The vacuum interrupter of claim 1 wherein the end cap comprises a planar portion and a cylindrical portion, the cylindrical portion extending from the planar portion and being situated adjacent the cylinder, the cylinder and the cylindrical portion meeting one another at a junction, the arcuate profile having an apex that is situated at a location adjacent the junction along the longitudinal direction.

4. The vacuum interrupter of claim 3 wherein the apex is substantially aligned with the junction along the longitudinal direction.

5. The vacuum interrupter of claim 1 wherein the insulative material is a silicone material.

6. The vacuum interrupter of claim 5 wherein the silicone material has a relative permittivity that is in a range of about 2.7 to 5.

7. The vacuum interrupter of claim 5 wherein the silicone material has a relative permittivity that is about 3.5.

8. The vacuum interrupter of claim 1 wherein the second portion comprises a metallic component that comprises at least one of a metallic body embedded in the second portion and a metallic covering situated on an outer surface of the second portion.

9. The vacuum interrupter of claim 8 wherein the metallic component comprises the metallic body, the metallic body extending about the envelope adjacent the end cap.

10. The vacuum interrupter of claim 9:
wherein the outer surface has an arcuate profile along a longitudinal direction with respect to the cylinder;
wherein the cylinder and the end cap meet one another at a junction, the arcuate profile having an apex that is situated at a location adjacent the junction along the longitudinal direction; and
wherein at least a portion of the metallic body is situated generally between the junction and the apex.

11. The vacuum interrupter of claim 1 wherein the coating further comprises another second portion situated adjacent the another end cap and having another second thickness greater than the first thickness in the radial direction.

12. The vacuum interrupter of claim 11 wherein the second portion and the another second portion each have an outer surface having an arcuate profile along a longitudinal direction with respect to the cylinder.

13. The vacuum interrupter of claim 12 wherein the arcuate profile is a toroidal profile.

14. The vacuum interrupter of claim 12:
wherein the end cap comprises a planar portion and a cylindrical portion, the cylindrical portion extending from the planar portion and being situated adjacent the cylinder, the cylinder and the cylindrical portion meeting one another at a junction, the arcuate profile of the second portion having an apex that is situated at a location adjacent the junction along the longitudinal direction; and
wherein the another end cap comprises another planar portion and another cylindrical portion, the another cylindrical portion extending from the another planar portion and being situated adjacent the cylinder opposite the end cap, the cylinder and the another cylindrical portion meeting one another at another junction, the arcuate profile of the another second portion having another apex that is situated at a location adjacent the another junction along the longitudinal direction.

15. The vacuum interrupter of claim 11:
wherein the second portion comprises a metallic component that comprises at least one of a metallic body embedded in the second portion and a metallic covering situated on an outer surface of the second portion; and
wherein the another second portion comprises another metallic component that comprises at least one of another metallic body embedded in the another second portion and another metallic covering situated on another outer surface of the another second portion.

16. The vacuum interrupter of claim 15:
wherein the metallic component comprises the metallic body, the metallic body extending about the envelope adjacent the end cap; and
wherein the another metallic component comprises the another metallic body, the another metallic body extending about the envelope adjacent the another end cap.

17. The vacuum interrupter of claim 16:
wherein the outer surface has an arcuate profile along a longitudinal direction with respect to the cylinder;
wherein the cylinder and the end cap meet one another at a junction, the arcuate profile having an apex that is situated at a location adjacent the junction along the longitudinal direction;
wherein at least a portion of the metallic body is situated generally between the junction and the apex;
wherein the another outer surface has another arcuate profile along the longitudinal direction;
wherein the cylinder and the another end cap meet one another at another junction, the another arcuate profile having another apex that is situated at another location adjacent the another junction along the longitudinal direction; and
wherein at least a portion of the another metallic body is situated generally between the another junction and the another apex.

* * * * *